US012600644B2

(12) United States Patent (10) Patent No.: US 12,600,644 B2
Ma et al. (45) Date of Patent: Apr. 14, 2026

(54) METHOD FOR PREPARING RARE EARTH OXIDE BY RECYCLING AMMONIA AND CARBON AND USE OF RARE EARTH OXIDE

(71) Applicant: BAOTOU RESEARCH INSTITUTE OF RARE EARTHS, Baotou (CN)

(72) Inventors: Shengfeng Ma, Baotou (CN); Yanhui Xu, Baotou (CN); Yu Li, Baotou (CN); Weihua Guan, Baotou (CN); Kai Gao, Baotou (CN); Jing Song, Baotou (CN)

(73) Assignee: BAOTOU RESEARCH INSTITUTE OF RARE EARTHS, Baotou (CN)

( * ) Notice: Subject to any disclaimer, the term of this patent is extended or adjusted under 35 U.S.C. 154(b) by 926 days.

(21) Appl. No.: 17/816,857

(22) Filed: Aug. 2, 2022

(65) Prior Publication Data

US 2022/0371908 A1     Nov. 24, 2022

(30) Foreign Application Priority Data

Dec. 13, 2021    (CN) .......................... 202111514433.5

(51) Int. Cl.
*C01F 17/206* (2020.01)
*C01F 17/247* (2020.01)

(52) U.S. Cl.
CPC .......... *C01F 17/206* (2020.01); *C01F 17/247* (2020.01)

(58) Field of Classification Search
CPC .... C01F 17/206; C01F 17/247; C01F 17/229; C01F 17/235; C01F 17/241; C01F 17/10; C01P 2002/54; C01P 2006/80; Y02P 10/20; C22B 1/02; C22B 3/44; C22B 59/00
See application file for complete search history.

(56) References Cited

FOREIGN PATENT DOCUMENTS

| CN | 1817403 | A | * | 8/2006 | |
| CN | 101475194 | B | | 12/2010 | |
| CN | 109399689 | A | * | 3/2019 | ............ C01F 17/206 |
| CN | 112850775 | A | * | 5/2021 | ............ C01F 17/235 |

OTHER PUBLICATIONS

Machine translation of CN-112850775-A (Year: 2021).*
Machine translation of CN-109399689-A (Year: 2019).*
Machine translation of CN-1817403-A (Year: 2006).*
Lin et al. (Study on the calcination experiments of rare earth carbonates using microwave heating, Green Process Synthesis, 2015) (Year: 2015).*

* cited by examiner

*Primary Examiner* — Anthony J Zimmer
*Assistant Examiner* — Logan Laclair
(74) *Attorney, Agent, or Firm* — Osha Bergman Watanabe & Burton LLP

(57) ABSTRACT

The present disclosure discloses a method for preparing rare earth oxide by recycling ammonia and carbon, comprising the steps of: (1) heating raw materials containing a first rare earth carbonate and a first rare earth oxide with microwave and calcining at 500-1000° C. for 20-120 min to obtain a second rare earth oxide and carbon dioxide; (2) reacting carbon dioxide with a first ammonia water to obtain a precipitant; (3) reacting the precipitant with rare earth chloride to obtain a second rare earth carbonate and ammonium chloride wastewater. In the method, calcination time is short, rare earth recovery rate, utilization rate of ammonia and carbon resources are high. The present disclosure also provides a use of a rare earth oxide in shortening calcination time and/or increasing rare earth yield.

6 Claims, No Drawings

METHOD FOR PREPARING RARE EARTH OXIDE BY RECYCLING AMMONIA AND CARBON AND USE OF RARE EARTH OXIDE

TECHNICAL FIELD OF THE DISCLOSURE

The present disclosure relates to a method for preparing rare earth oxide by recycling ammonia and carbon, and also relates to a use of rare earth oxide.

BACKGROUND OF THE DISCLOSURE

Rare earth elements have unique physical and chemical properties, and have been widely used in military defense, catalysts, luminescent materials, permanent magnet materials and other fields. As the raw material for novel high-performance materials, the demand for rare earth oxides is gradually increasing. The method for preparing rare earth oxide by calcination and decomposition of rare earth carbonate has become the main process involving in the preparing rare earth oxide because of its advantages of low cost and environmental friendliness. Nowadays, tunnel kilns, roller kilns or pusher kilns are mainly used as reaction equipment to heat and decompose rare earth carbonates. Natural gas, as heating energy, pollutes carbon dioxide, leading that the carbon resources are unusable.

CN109399689A discloses a method for preparing rare earth oxide with a microwave technology. The method comprises the steps of: (1) microwave drying: oxalic acid rare earth or carbonic acid rare earth is subjected to microwave radiation in microwave equipment, so that the water content of the oxalic acid rare earth or the carbonic acid rare earth reaches 3-5%; (2) microwave preheating: the temperature is increased till the water content of the oxalic acid rare earth or the carbonic acid rare earth reaches zero; (3) microwave ignition: the temperature is increased to 700-1000° C. for 30-50 minutes; (4) gradient air cooling: the temperature is decreased with cold wind to obtain the rare earth oxide. Rare earth carbonate has poor microwave absorbing ability, so the heating time is long, which leads to low roasting efficiency.

CN112850775A discloses a method for recycling carbon-ammonia in a rare earth oxide production process. The method comprises the steps of organic phase saponification, extraction, hydrochloric acid reverse extraction, precipitation and calcination, ammonia-nitrogen wastewater is generated in the extraction and precipitation processes, carbon dioxide is generated in the precipitation and calcination processes, the ammonia-nitrogen wastewater is subjected to steam stripping ammonia distillation to obtain ammonia water, ammonia water, water and the carbon dioxide are mixed for carbonization to obtain an ammonium bicarbonate solution, and the obtained ammonium bicarbonate solution is returned to the precipitation step to be used as a precipitator. The method is suitable for the traditional preparation method of rare earth oxide by heating decomposition. And the utilization rate of carbon and ammonia resources is low.

SUMMARY OF THE DISCLOSURE

In view of this, the present disclosure provides a method for preparing rare earth oxide by recycling ammonia and carbon. In this method, the calcinations time is short, and the recovery rate of rare earth and the utilization rate of carbon and carbon resources are high. The present disclosure also provides a use of rare earth oxide in shortening calcination time and/or increasing rare earth yield.

The above technical purposes are achieved through the following technical scheme.

In one aspect, the present disclosure provides a method for preparing rare earth oxide by recycling ammonia and carbon, the method comprises the steps of:

(1) heating raw materials containing a first rare earth carbonate and a first rare earth oxide with microwave and calcining at 500-1000° C. for 20-120 min to obtain the second rare earth oxide and carbon dioxide; wherein the rare earth oxide has an amount of 1-30 wt %, based on the rare earth carbonate;

(2) reacting carbon dioxide with a first ammonia water with a concentration of 10-20 wt % to obtain a precipitant;

(3) reacting the precipitant with rare earth chloride to obtain a second rare earth carbonate and ammonium chloride wastewater.

According to the method of the present disclosure, preferably, the first rare earth carbonate is one or more selected from the group consisting of lanthanum carbonate, cerium carbonate, praseodymium carbonate and neodymium carbonate; the first rare earth oxide is one or more selected from the group consisting of lanthanum oxide, cerium oxide, praseodymium oxide and neodymium oxide; and the rare earth chloride is one or more selected from the group consisting of lanthanum chloride, cerium chloride, praseodymium chloride and neodymium chloride.

According to the method of the present disclosure, preferably, the first rare earth carbonate, the first rare earth oxide and the rare earth chloride have an identical rare earth element.

According to the method of the present disclosure, preferably, the precipitant has a total alkalinity of 2-5 mol/L.

According to the method of the present disclosure, preferably, in step (3), the precipitant is reacted with rare earth chloride at 20-60° C. for 0.5-5 h, and then aged for 0.5-10 h, so as to obtain a reaction product; and then the reaction product is filtered to obtain the second rare earth carbonate and ammonium chloride wastewater, respectively.

According to the method of the present disclosure, preferably, the first rare earth carbonate has a content of rare earth elements of 30-60 wt %, and the first rare earth oxide has a purity of higher than or equal to 80 wt %; wherein the content of rare earth elements is calculated based on the rare earth oxide.

According to the method of the present disclosure, preferably, the method also comprises the steps of:

returning the second rare earth carbonate obtained in step (3) to step (1) as raw material.

The method according to the present disclosure, preferably, the method also comprises the steps of:

(4) evaporating ammonium chloride wastewater to obtain the second ammonia water;

returning the second ammonia obtained in step (4) to step (2) as raw material to react with carbon dioxide.

In another aspect, the present disclosure provides a use of rare earth oxide in shortening calcination time and/or increasing rare earth yield. Raw materials containing rare earth carbonate and rare earth oxide are calcined by microwave heating, and the rare earth oxide has an amount of 1-30 wt % based on the rare earth carbonate.

According to the use of the present disclosure, preferably, the calcination is performed at a temperature of 500-1000° C. for 20-120 min.

In the present disclosure, in the presence of rare earth oxide, the rare earth carbonate is calcined with microwave heating, so the calcination time is shortened and the yield of rare earth is increased. Furthermore, the carbon dioxide produced in the present method has less dust and other impurities, which can directly react with ammonia water to form a precipitant. By selecting ammonia water with appropriate concentration, the present disclosure can increase the utilization rate of carbon resources, and form a precipitant with appropriate concentration to increase the utilization rate of ammonia resources.

DETAIL DESCRIPTION OF THE DISCLOSURE

The present disclosure will be further explained, but the protection scope of the present disclosure is not limited thereto.

<Method for Preparing Rare Earth Oxide by Recycling Ammonia and Carbon>

In the present disclosure, the method for preparing rare earth oxide by recycling ammonia and carbon comprises:

(1) the calcination step; (2) the step of forming precipitant; (3) the precipitation step. In some embodiments, the method may also comprise (4) the step of evaporating ammonia.

Calcination Step

The raw materials containing a first rare earth carbonate and a first rare earth oxide are calcined with microwave heating, so as to obtain the second rare earth oxide and carbon dioxide. In some embodiments, the raw materials consist of a first rare earth carbonate and a first rare earth oxide.

Rare earth carbonate has a poor microwave absorption performance in a microwave field, which leads to an increase of overall calcination time. It is unexpectedly found that adding appropriate rare earth oxide into rare earth carbonate can quickly reach a preset temperature, shorten a temperature rising time, greatly reduce energy consumption, improve production efficiency and reduce production cost; meanwhile, this can also increase a recovery rate of rare earth.

The rare earth elements in the first rare earth carbonate may be one or more selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) or scandium (Sc). Preferably, the first rare earth carbonate is one or more selected from the group consisting of lanthanum carbonate, cerium carbonate, praseodymium carbonate and neodymium carbonate. More preferably, the first rare earth carbonate is one selected from the group consisting of lanthanum carbonate, cerium carbonate, lanthanum-cerium carbonate, and praseodymium-neodymium carbonate. In lanthanum-cerium carbonate, the content of lanthanum carbonate may be 1-95 wt %; in some embodiments, the content of lanthanum carbonate is 10-80 wt %; in other embodiments, the content of lanthanum carbonate is 30-60 wt %. In lanthanum-cerium carbonate, the content of cerium carbonate may be 1-95 wt %; in some embodiments, the content of cerium carbonate is 15-75 wt %; in other embodiments, the content of cerium carbonate is 40-60 wt %. In praseodymium-neodymium carbonate, the content of praseodymium carbonate may be 1-95 wt %; in some embodiments, the content of praseodymium carbonate may be 10-70 wt %; in other embodiments, the content of praseodymium carbonate may be 20-50 wt %. In praseodymium-neodymium carbonate, the content of neodymium carbonate may be 1-95 wt %; in some embodiments, the content of neodymium carbonate is 30-85 wt %; in other embodiments, the content of neodymium carbonate is 60-80 wt %.

The content of rare earth elements in the first rare earth carbonate may be 30-60 wt %, preferably, 40-60 wt %; more preferably, 50-55 wt %. Rare earth elements are calculated based on the rare earth oxide.

The rare earth elements in the first rare earth oxide may be one or more selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) or scandium (Sc). Preferably, the first rare earth oxide is one or more selected from the group consisting of lanthanum oxide, cerium oxide, praseodymium oxide and neodymium oxide. More preferably, the first rare earth oxide is one or more selected from the group consisting of lanthanum oxide, cerium oxide, lanthanum-cerium oxide, and praseodymium-neodymium oxide. In lanthanum-cerium oxide, the content of lanthanum oxide may be 1-95 wt %; in some embodiments, the content of lanthanum oxide is 10-80 wt %; in other embodiments, the content of lanthanum oxide is 30-60 wt %. In lanthanum-cerium oxide, the content of cerium oxide may be 1-95 wt %; in some embodiments, the content of cerium oxide is 15-75 wt %; in other embodiments, the content of cerium oxide is 40-60 wt %. In praseodymium-neodymium oxide, the content of praseodymium oxide may be 1-95 wt %; in some embodiments, the content of praseodymium oxide may be 10-70 wt %; in other embodiments, the content of praseodymium oxide may be 20-50 wt %. In praseodymium-neodymium oxide, the content of neodymium oxide may be 1-95 wt %; in some embodiments, the content of neodymium oxide is 30-85 wt %; in other embodiments, the content of neodymium oxide is 60-80 wt %.

The purity of rare earth oxide may be more than or equal to 80 wt %; preferably, more than or equal to 89 wt %; more preferably, 95-100 wt %.

The amount of the first rare earth oxide is 1-30 wt % of the first rare earth carbonate, preferably, 3-20 wt %, more preferably, 9-15 wt %. This can reduce the addition amount of the first rare earth oxide, and effectively shorten the calcination time and increase the yield of rare earth.

According to an embodiment of the present disclosure, the rare earth elements in the first rare earth carbonate and the first rare earth oxide are identical. Preferably, the first rare earth carbonate is cerium carbonate, and the first rare earth oxide is cerium oxide.

The calcination temperature is 500-1000° C.; preferably, 550-800° C.; more preferably, 600-700° C. In such a way, the calcination temperature can be decreased, and the rare earth carbonate can be fully decomposed.

The calcination time is 20-120 min, preferably 70-100 min, more preferably, 85-95 min. In such a way, the calcination time can be shortened and the rare earth carbonate can be fully decomposed. In the present disclosure, the calcination time comprises the time of heating up to the calcination temperature and the time of calcining at the calcination temperature.

Step of Forming Precipitant

Carbon dioxide is reacted with the first ammonia water to obtain a precipitant.

The concentration of the first ammonia water is 10-20 wt %, preferably 15-19 wt %, more preferably 17-18 wt %. A low concentration of ammonia water leads to a decline of carbon resource utilization. A too high concentration of ammonia water is not conducive to the formation of rare earth carbonate from rare earth chloride.

A total alkalinity of the precipitant may be 2-5 mol/L, preferably 2.5-4 mol/L, more preferably 3-3.5 mol/L. Such a concentration can avoid formation of basic carbonate during the reaction of ammonia water and rare earth chloride, and reduce energy consumption of ammonia evaporation from ammonium chloride wastewater.

Precipitation Step

The precipitant is reacted with rare earth chloride to obtain a second rare earth carbonate and ammonium chloride wastewater.

The rare earth elements in the rare earth chloride may be one or more selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) or scandium (Sc). Preferably, the rare earth chloride is one or more selected from the group consisting of lanthanum chloride, cerium chloride, praseodymium chloride and neodymium chloride. More preferably, the rare earth chloride is one or more selected from the group consisting of lanthanum chloride, cerium chloride, lanthanum-cerium chloride, and praseodymium-neodymium chloride. In lanthanum-cerium chloride, the content of lanthanum chloride may be 1-95 wt %; in some embodiments, the content of lanthanum chloride is 10-80 wt %; in other embodiments, the content of lanthanum chloride is 30-60 wt %. In lanthanum-cerium chloride, the content of cerium chloride may be 1-95 wt %; in some embodiments, the content of cerium chloride is 15-75 wt %; in other embodiments, the content of cerium chloride is 40-60 wt %. In praseodymium-neodymium chloride, the content of praseodymium chloride may be 1-95 wt %; in some embodiments, the content of praseodymium chloride may be 10-70 wt %; in other embodiments, the content of praseodymium chloride may be 20-50 wt %. In praseodymium-neodymium chloride, the content of neodymium chloride may be 1-95 wt %; in some embodiments, the content of neodymium chloride is 30-85 wt %; in other embodiments, the content of neodymium chloride is 60-80 wt %.

According to an embodiment of the present disclosure, the rare earth elements in the rare earth chloride are identical to the rare earth elements in the first rare earth carbonate and the first rare earth oxide. Preferably, the rare earth chloride is cerium chloride, the first rare earth carbonate is cerium carbonate, and the first rare earth oxide is cerium oxide.

Specifically, the precipitant is reacted with rare earth chloride, and then aged to obtain a reaction product. The reaction product is filtered to obtain the second rare earth carbonate and ammonium chloride wastewater respectively.

The reaction temperature may be 20-60° C.; preferably 30-55° C.; more preferably 45-50° C.

The reaction time may be 0.5-10 h; preferably 1-5 h; more preferably 2-4 h.

The aging time may be 0.5-10 h; preferably 1-5 h; more preferably 1-2 h.

Rare earth chlorides may be used in a solution. The precipitant can be reacted with rare earth chloride solution in a cocurrent manner. The concentration of rare earth chloride solution may be 60-300 g/L; preferably 80-270 g/L; more preferably 100-250 g/L.

In some embodiments, the method may also comprise the step of returning the second rare earth carbonate to the calcination step as a raw material.

Step of Ammonia Evaporation

Ammonia is evaporated from ammonium chloride wastewater, so as to obtain the second ammonia water.

The conventional method in the art can be used as the ammonia evaporation method. For example, the method disclosed in CN101475194B can be adopted.

In some embodiments, the method may also comprise the step of returning the second ammonia water to the step of forming precipitant to be reacted with carbon dioxide.

In the present disclosure, the rare earth yield is more than 99%; preferably, more than 99.9%. The utilization rate of carbon resources is more than 90%; preferably, more than 93%; more preferably 94.5-96%. The utilization rate of ammonia resources is more than 89%; preferably 90%; more preferably 91-92.5%.

<Use of Rare Earth Oxide>

It was unexpectedly found that calcining rare earth carbonate and rare earth oxide as raw materials with microwave heating could reduce the decomposition time of rare earth carbonate and increase the yield of rare earth. Therefore, the present disclosure provides a use of rare earth oxide in shortening calcination time and/or increasing rare earth yield. Raw materials containing rare earth carbonate and rare earth oxide are calcined with microwave heating. In some embodiments, the raw materials consist of rare earth carbonate and rare earth oxide.

The rare earth elements in the rare earth carbonate may be one or more selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) or scandium (Sc). Preferably, the rare earth carbonate is one or more selected from the group consisting of lanthanum carbonate, cerium carbonate, praseodymium carbonate and neodymium carbonate. More preferably, the rare earth carbonate is one selected from the group consisting of lanthanum carbonate, cerium carbonate, lanthanum-cerium carbonate, praseodymium-neodymium carbonate. In lanthanum-cerium carbonate, the content of lanthanum carbonate may be 1-95 wt %; in some embodiments, the content of lanthanum carbonate is 10-80 wt %; in other embodiments, the content of lanthanum carbonate is 30-60 wt %. In lanthanum-cerium carbonate, the content of cerium carbonate may be 1-95 wt %; in some embodiments, the content of cerium carbonate is 15-75 wt %; in other embodiments, the content of cerium carbonate is 40-60 wt %. In praseodymium-neodymium carbonate, the content of praseodymium carbonate may be 1-95 wt %; in some embodiments, the content of praseodymium carbonate may be 10-70 wt %; in other embodiments, the content of praseodymium carbonate may be 20-50 wt %. In praseodymium-neodymium carbonate, the content of neodymium carbonate may be 1-95 wt %; in some embodiments, the content of neodymium carbonate is 30-85 wt %; in other embodiments, the content of neodymium carbonate is 60-80 wt %.

The content of rare earth elements in the rare earth carbonate may be 30-60 wt %, preferably 40-60 wt %; more preferably 50-55 wt %. Rare earth elements are calculated based on the rare earth oxide.

The rare earth elements in the rare earth oxide may be one or more selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) or scandium (Sc). Preferably, the rare earth oxide is one or more selected from the group consisting of lanthanum oxide, cerium oxide, praseodymium oxide and neodymium oxide. More preferably, the rare earth oxide is one or more selected from lanthanum oxide, cerium oxide, lanthanum-cerium oxide, and praseodymium-neodymium oxide. In lanthanum-cerium oxide, the content of lanthanum oxide may be 1-95 wt %; in some embodiments, the content of lanthanum oxide is 10-80 wt %; in other embodiments, the content of lanthanum oxide is 30-60 wt %. In lanthanum-cerium oxide, the content of cerium oxide may be 1-95 wt %; in some embodiments, the content of cerium oxide is 15-75 wt %; in other embodiments, the content of cerium oxide is 40-60 wt %. In praseodymium-neodymium oxide, the content of praseodymium oxide may be 1-95 wt %; in some embodiments, the content of praseodymium oxide may be 10-70 wt %; in other embodiments, the content of praseodymium oxide may be 20-50 wt %. In praseodymium-neodymium oxide, the content of neodymium oxide may be 1-95 wt %; in some embodiments, the content of neodymium oxide is 30-85 wt %; in other embodiments, the content of neodymium oxide is 60-80 wt %.

The purity of rare earth oxide may be more than or equal to 80 wt %; preferably, more than or equal to 89 wt %; more preferably, 95-100 wt %.

The amount of the rare earth oxide is 1-30 wt % of the rare earth carbonate, preferably 3-20 wt %, more preferably 9-15 wt %. This cannot only reduce the addition amount of the rare earth oxide, but also effectively shorten the calcination time and increase the yield of rare earth.

According to an embodiment of the present disclosure, the rare earth elements in the rare earth carbonate and the rare earth oxide are identical. Preferably, the rare earth carbonate is cerium carbonate, and the rare earth oxide is cerium oxide.

The calcination temperature is 500-1000° C.; preferably, 550-800° C.; more preferably, 600-700° C. In such a way, the calcination temperature can be decreased, and the rare earth carbonate can be fully decomposed.

The calcination time is 20-120 min, preferably 70-100 min, more preferably 85-95 min. In such a way, the calcination time can be shortened and the rare earth carbonate can be fully decomposed. In the present disclosure, the calcination time comprises the time of heating up to the calcination temperature and the time of calcining at the calcination temperature.

According to an embodiment of the present disclosure, the method may also comprise: the step of forming precipitant; the precipitation step and the ammonia evaporation step. Details are mentioned above, so they will not be repeated here.

The determination methods are described as follows:

$$\text{Rare earth yield}=(\text{Total amount of rare earth in the second rare earth oxide}-\text{Total amount of rare earth in the first rare earth oxide})/\text{Total amount of rare earth in the first rare earth carbonate}$$

wherein the total amount of rare earth in the rare earth oxide and the rare earth carbonate is calculated based on the rare earth oxide.

The total amount of rare earth in the rare earth oxide and the rare earth carbonate is determined with gravimetric method.

$$\text{Utilization rate of carbon resources}=\text{Mass of carbon dioxide with equivalent mole of carbon in precipitator}/\text{Mass of carbon dioxide with equivalent mole of carbon in the first rare earth carbonate}$$

The carbon content in the precipitant is determined by the double indicator titration method.

The content of carbon in rare earth carbonate is determined by the acid-base titration method.

$$\text{Utilization rate of ammonia resource}=\text{Moles of } NH_4^+ \text{ in the first ammonia water}/\text{Moles of } NH_4^+ \text{ in ammonium chloride wastewater}$$

The moles of $NH_4^+$ are determined by the titration method.

Examples 1-4

(1) Raw materials consisting of a first rare earth carbonate and a first rare earth oxide were calcined with microwave heating, and a second rare earth oxide and carbon dioxide were obtained;

(2) carbon dioxide was reacted with a first ammonia water, and then a precipitant was obtained;

(3) the precipitant was reacted with a rare earth chloride solution in a cocurrent manner, and then aged, so a reaction product was obtained; then the reaction product was filtered, and then a second rare earth carbonate and ammonium chloride wastewater were obtained, respectively. The second rare earth carbonate was returned to step (1), and used as raw material.

Specific parameters were shown in Table 1. The rare earth yield, utilization rate of carbon resource and utilization rate of ammonia resource were shown in Table 1.

TABLE 1

| | Example 1 | Example 2 | Example 3 | Example 4 |
|---|---|---|---|---|
| The first rare earth carbonate | lanthanum carbonate | cerium carbonate | lanthanum-cerium carbonate | praseodymium-neodymium carbonate |
| Amount of the first rare earth carbonate (kg) | 100 | 100 | 100 | 100 |
| Content of rare earth elements in the first rare earth carbonate (wt %) | 55.3 | 54.9 | 45.7 | 45.7 |
| The first rare earth oxide | lanthanum oxide | cerium oxide | lanthanum-cerium oxide | praseodymium-neodymium oxide |
| Purity of the rare earth oxide | 98.2 | 99.7 | 92.5 | 92.5 |
| Amount of the first rare earth oxide (kg) | 5 | 10 | 8.3 | 23 |
| Calcination temperature (° C.) | 800 | 600 | 750 | 750 |
| Calcination time (min) | 120 | 90 | 95 | 100 |
| Concentration of the first ammonia water (wt %) | 16.8 | 17.5 | 15.6 | 13.2 |
| Total alkalinity of precipitant (mol/L) | 2.7 | 3.0 | 2.5 | 2.9 |
| Rare earth chloride | lanthanum chloride | cerium chloride | lanthanum-cerium chloride | praseodymium-neodymium chloride |

TABLE 1-continued

| | Example 1 | Example 2 | Example 3 | Example 4 |
|---|---|---|---|---|
| Concentration of rare earth chloride solution (g/L) | 200 | 230 | 180 | 110 |
| Reaction temperature (° C.) | 30 | 50 | 40 | 40 |
| Reaction time (h) | 2 | 3 | 2.5 | 4 |
| Aging time (h) | 1 | 1.5 | 1.5 | 2 |
| Yield of rare earth (%) | 99.8 | 99.9 | 99.7 | 99.8 |
| Utilization rate of carbon resources (%) | 94.5 | 94.7 | 93.1 | 91.9 |
| Utilization rate of ammonia resources (%) | 89.2 | 91.3 | 90.7 | 89.9 |

Note: the content of rare earth elements in the first rare earth carbonate was calculated based on the rare earth oxide.

The content of lanthanum carbonate in lanthanum-cerium carbonate was 47.8 wt %; the content of cerium carbonate in lanthanum-cerium carbonate was 52.2 wt %.

The content of lanthanum oxide in lanthanum-cerium oxide was 47.8 wt %; the content of cerium oxide in lanthanum-cerium oxide was 52.2 wt %.

The content of lanthanum chloride in lanthanum-cerium chloride was 47.8 wt %; the content of cerium chloride in lanthanum-cerium chloride was 52.2 wt %.

The content of praseodymium carbonate in praseodymium-neodymium carbonate was 27.8 wt %; the content of neodymium carbonate in praseodymium-neodymium carbonate was 72.2 wt %.

The content of praseodymium oxide in praseodymium-neodymium oxide was 27.8 wt %; the content of neodymium oxide in praseodymium-neodymium oxide was 72.2 wt %.

The content of praseodymium chloride in praseodymium-neodymium chloride was 27.8 wt %; the content of neodymium chloride in praseodymium-neodymium chloride was 72.2 wt %.

Examples 5-8

Ammonia evaporations were performed on the ammonium chloride wastewater obtained in examples 1-4, respectively, and a second ammonia water was obtained. The second ammonia water was returned to step (2) as raw material to be reacted with carbon dioxide.

The present invention is not limited to the above embodiments. Without departing from the essence of the present invention, any deformation, improvement and replacement that can be thought of by those skilled in the art fall within the scope of the invention.

What is claimed is:

1. A method for preparing rare earth oxide by recycling ammonia and carbon dioxide, comprising the steps of:
(1) heating raw materials containing a first rare earth carbonate and a first rare earth oxide with microwave radiation, thereby calcining the raw materials at 550-700° C. for 85-90 min to obtain a second rare earth oxide and carbon dioxide; wherein an amount of the first rare earth oxide is 9-15 wt %, based on the first rare earth carbonate;
(2) reacting carbon dioxide with a first ammonia water with a concentration of 15-19 wt % to obtain a precipitant having a total alkalinity of 2-4 mol/L;
(3) reacting the precipitant with rare earth chloride to obtain a second rare earth carbonate and ammonium chloride wastewater; and
returning the second rare earth carbonate to step (1) as raw material.

2. The method according to claim 1, wherein the first rare earth carbonate is one or more selected from the group consisting of lanthanum carbonate, cerium carbonate, praseodymium carbonate and neodymium carbonate, the first rare earth oxide is one or more selected from the group consisting of lanthanum oxide, cerium oxide, praseodymium oxide and neodymium oxide, the rare earth chloride is one or more selected from the group consisting of lanthanum chloride, cerium chloride, praseodymium chloride and neodymium chloride.

3. The method according to claim 1, wherein the first rare earth carbonate, the first rare earth oxide and the rare earth chloride have an identical rare earth element.

4. The method according to claim 1, wherein the precipitant is reacted with the rare earth chloride at 20-60° C. for 0.5-5 h, and then aged for 0.5-10 h, so as to obtain a reaction product; and then the reaction product is filtered to obtain the second rare earth carbonate and ammonium chloride wastewater, respectively.

5. The method according to claim 1, wherein the first rare earth carbonate has a content of rare earth elements of 30-60 wt %, and the first rare earth oxide has a purity of higher than or equal to 80 wt %; where the content of rare earth elements is calculated based on the rare earth oxide.

6. The method according to claim 1, also comprising the step of:
(4) evaporating ammonium chloride wastewater to obtain a second ammonia water;
returning the second ammonia water obtained in step (4) to step (2) as raw material to react with carbon dioxide.

* * * * *